(12) United States Patent
Balasubramanian

(10) Patent No.: US 7,059,584 B2
(45) Date of Patent: Jun. 13, 2006

(54) DIAPHRAGM VALVE HAVING ADJUSTABLE CLOSURE MEANS

(76) Inventor: Kay Balasubramanian, 216 Trenton Avenue, Mount Royal, Quebec (CA) H3P 1Z5

( * ) Notice: Subject to any disclaimer, the term of this patent is extended or adjusted under 35 U.S.C. 154(b) by 17 days.

(21) Appl. No.: 10/731,106

(22) Filed: Dec. 10, 2003

(65) Prior Publication Data

US 2005/0035325 A1 Feb. 17, 2005

Related U.S. Application Data

(60) Provisional application No. 60/432,016, filed on Dec. 10, 2002.

(51) Int. Cl.
*F16K 51/00* (2006.01)

(52) U.S. Cl. .................. 251/264; 251/285; 251/331

(58) Field of Classification Search ............... 251/264, 251/285, 331, 335.2
See application file for complete search history.

(56) References Cited

U.S. PATENT DOCUMENTS

| | | | |
|---|---|---|---|
| 2,540,371 A | 2/1951 | Jacobsen | |
| 3,250,511 A | 5/1966 | Priese | |
| 3,565,089 A | 2/1971 | Thompson | |
| 4,014,514 A | 3/1977 | Priese | |
| 4,505,451 A | 3/1985 | Jonas | |
| 4,588,163 A | 5/1986 | Christensen | |
| 4,968,003 A | 11/1990 | Danko | |
| 5,188,338 A * | 2/1993 | Itoi | 251/265 |
| 5,377,956 A | 1/1995 | Muller | |
| 5,823,509 A | 10/1998 | Daniels | |
| 6,196,523 B1 | 3/2001 | Miyata et al. | |

* cited by examiner

*Primary Examiner*—Justine R. Yu
*Assistant Examiner*—Peter deVore
(74) *Attorney, Agent, or Firm*—Bereskin & Parr

(57) ABSTRACT

The present invention provides a diaphragm valve moveable between a fully open position and a fully closed position, the valve comprising: a bonnet having a first thread and an abutment surface; a stem having at least one aperture and a second thread that cooperates with the first thread to allow the stem to be axially moveable relative to the bonnet; a handwheel being freely rotatable on the stem and freely axially slidable on the stem and having a stop with a surface for contacting the abutment surface of the bonnet; and a pin extending through the handwheel and into the at least one aperture in the stem for limiting rotary motion of the handwheel relative to the stem. In one aspect of the invention, the at least one aperture is a slot. In another aspect of the invention, the at least one aperture is a plurality of apertures.

18 Claims, 7 Drawing Sheets

DIAPHRAGM VALVE HAVING ADJUSTABLE CLOSURE MEANS

FIELD OF THE INVENTION

The present invention generally relates to a fluid regulating device, and more particularly to a diaphragm valve having an adjustable closure means for limiting the valve stem travel to prevent excessive compressive forces on the diaphragm.

BACKGROUND OF THE INVENTION

A conventional diaphragm valve typically has a valve housing including a valve seat and a bonnet, a handwheel, a flexible diaphragm made of an elastomeric material, a compressor, and a stem. The flow rate of a fluid passing through the valve housing can be controlled by manually rotating the handwheel to adjust the position of the diaphragm relative to the valve seat.

A conventional diaphragm valve is typically positioned in a conduit of a system for controlling fluid flow through the conduit. One problem that can be encountered with a conventional diaphragm valve is the tendency rotate the handwheel unduly while adjusting the valve into the closed position, which may result in excessive compressive forces on the diaphragm. This may damage the surface of the diaphragm to the point where it has to be replaced. This repair work tends to be expensive, time consuming, and temporarily disrupts the operation of the system.

SUMMARY OF THE INVENTION

In accordance with one aspect of the invention, the present invention provides for a diaphragm valve, moveable between a fully open position and a fully closed position, the valve comprising:

a) a bonnet having an abutment surface;

b) a stem moveable relative to the bonnet, the stem having at least one aperture;

c) a handle, which in the preferred embodiment is a handwheel, being freely rotatable on the stem and freely axially slidable on the stem and having a stop with a surface for contacting the abutment surface of the bonnet; and d) a pin extending through the handle and into the at least one aperture in the stem for fixing the position of the handle relative to the stem.

In a preferred embodiment, the bonnet also has a first thread and the stem has a second thread that cooperates with the first thread to allow the stem to be axially moveable relative to the bonnet.

In the preferred embodiment, the pin limits the rotary motion of the handle relative to the stem.

In accordance with one aspect of the invention, the at least one aperture comprises a slot that extends radially into the stem and axially along the stem and has a circumferential width adapted to receive the pin.

In accordance with a further aspect of the invention, the slot has a first end and a second end and the pin is moveable between a first position adjacent the first end and a second position adjacent the second end.

In accordance with a further aspect of the invention, when the pin is in the first position and the valve is in the fully open position the distance between the surface of the stop of the handle and the abutment surface of the bonnet is substantially equal to the stroke of the valve.

In accordance with a further aspect of the invention, when the pin is in the second position and the valve is in the fully opened position the surface of the stop of the handle contacts the abutment surface of the bonnet.

In accordance with a further aspect of the invention, when the pin is in the first position and the valve is in the fully closed position the surface of the stop of the handle contacts the abutment surface of the bonnet.

In accordance with a further aspect of the invention, the at least one aperture comprises a first aperture and a second aperture and the pin is moveable between a first position in the first aperture and a second position in the second aperture.

In accordance with a further aspect of the invention, when the pin is in the first position and the valve is in the fully opened position the distance between the surface of the stop of the handle and the abutment surface of the bonnet is substantially equal to the stroke of the valve.

In accordance with a further aspect of the invention, when the pin is in the second position and the valve is in the fully opened position the surface of the stop of the handle contacts the abutment surface of the bonnet.

In accordance with a further aspect of the invention, when the pin is in the first position and the valve is in the fully closed position the surface of the stop of the handle contacts the abutment surface of the bonnet.

In accordance with a further aspect of the invention, further comprising at least one additional aperture positioned between the first aperture and the second aperture.

This invention also provides for a method of moving a diaphragm valve from a one of a fully locked open position or a fully locked closed position to the other of a fully locked closed position or a fully locked open position, the diaphragm valve having a bonnet, a stem, and a handle. In particular, to move the valve from a fully locked closed position to a fully open position, the method comprises securing the handle to the stem in a first position (which sets the valve to a fully locked position) and displacing the stem using the handle to move the stem relative to the bonnet to fully open the valve.

To move the valve from the fully open position described to a second fully open position wherein the valve is locked in the open position, the handle is secured to the stem in a second position once the valve is fully opened as described above, thereby locking the valve in the fully open position. In particular, the handle is displaced relative to the stem to achieve the second position.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which.

DETAILED DESCRIPTION OF THE INVENTION

Figure 1:
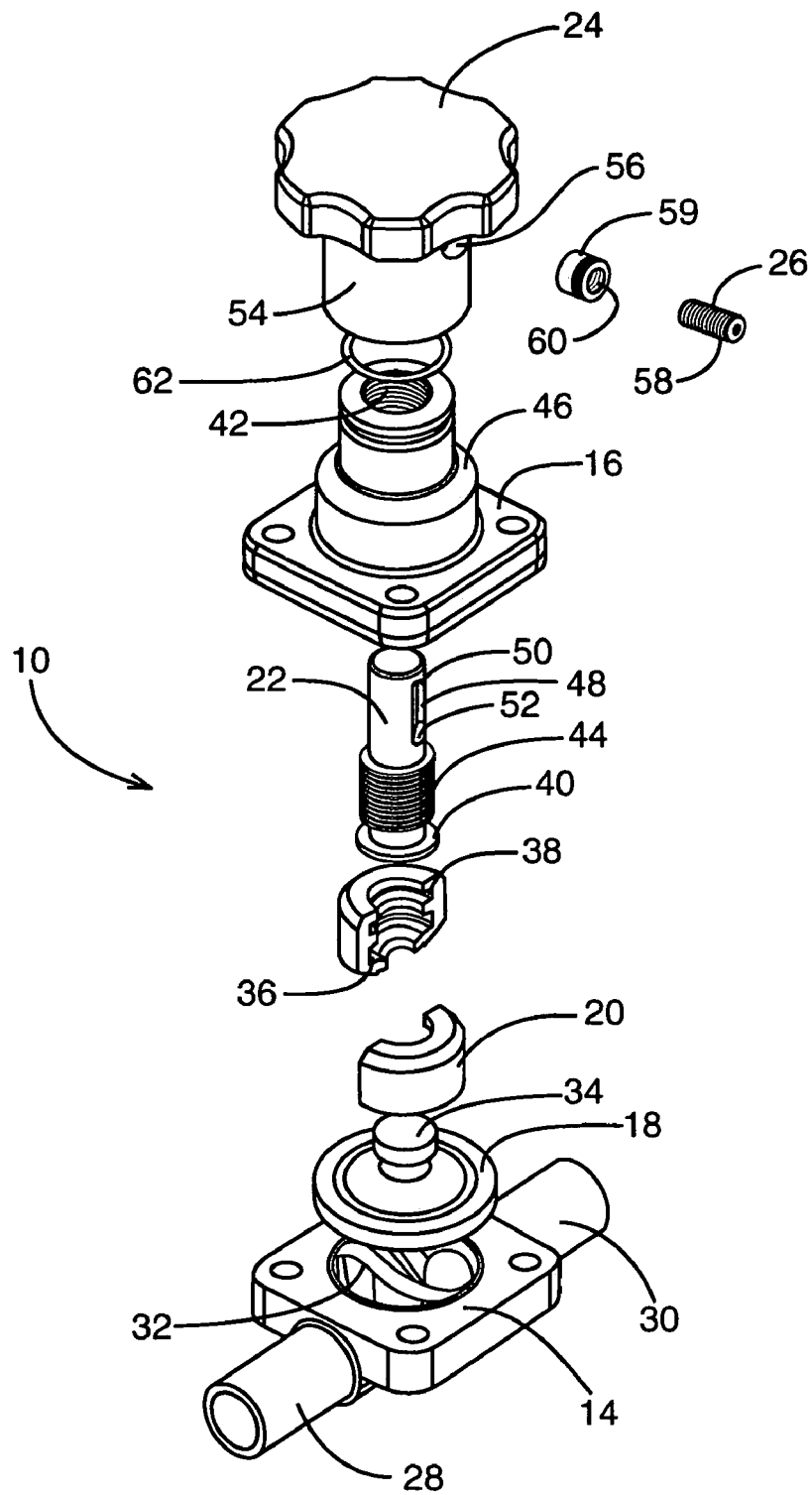
FIG. 1 is an exploded perspective view of a diaphragm valve moveable between a fully opened position and a fully closed position and having a pin moveable between a first position and a second position in accordance with a first embodiment of the present invention.

Referring first to FIG. 1, an exploded perspective view of a diaphragm valve in accordance with a first embodiment of the present invention is shown generally at 10. The valve 10 generally comprises a valve housing 12 (see FIG. 2) including a valve body 14 and a bonnet 16, a handwheel 24, a resilient diaphragm 18, a compressor 20, a stem 22, and a pin 26.

The valve body 14 has an inlet port 28 and an outlet port 30 for permitting the passage of a fluid through the valve 10. The valve body 14 has a valve seat 32 (see FIG. 2) that cooperates with the resilient diaphragm 18 for regulating the flow rate of the fluid through the valve 10.

The resilient diaphragm 18 is disposed between the bonnet 16 and the valve body 14. The resilient diaphragm 18 may be comprised of any suitable material known in the art, such as, for example, rubber. The resilient diaphragm 18 and the stem 22 are coupled together by compressor 20. In one aspect of the invention, the resilient diaphragm 18 has, in cross-section, a T-shaped portion 34 that is received in a first complementary recess 36 in the compressor 20. Spaced from first recess 36 is a second recess 38 for receiving a complementary T-shaped (in cross-section) fitting 40 on the stem 22. The compressor 20 securely couples the stem 22 to the diaphragm 18 and is moveable axially by the stem 22 for controlling the position of the resilient diaphragm 18 relative to the valve seat 32.

The bonnet 16 has a thread 42, and the stem 22 has a thread 44 that matingly cooperates with the thread 42 to allow the stem 22 to be axially moveable relative to the bonnet 16. The bonnet 16 has an abutment surface 46 (see FIG. 1) that acts as a travel stop for the handwheel 24, limiting the downward axial movement of the stem 22, as will hereinafter be explained. Bonnet 16 also has an inner surface 200 (see FIG. 5) that acts as a travel stop for the compressor 20, limiting the upward axial movement of the stem 22, as will be described in more detail below.

The stem 22 has at least one aperture, which in this embodiment comprises a slot 48. Preferably, the slot 48 extends radially into the stem 22 and axially along the stem 22 and has a circumferential width adapted to receive the pin 26. The slot 48 has a first end 50 and a second end 52.

The handwheel 24 has a hole 56 for receiving the pin 26. In one aspect of the invention, the hole 56 has an internal thread (not shown), and the pin 26 has a thread 58 to cooperate with the thread in the hole 56 to allow the pin 26 to be moveable relative to the stem 22. In another aspect of the invention, an internal spanner 59 having a thread 60 is fitted into the hole 56 to cooperate with the thread 58 on the pin 26 to allow the pin 26 to be moveable relative to the handwheel 24. In one aspect of the invention, an O-ring 62 can be disposed between the handwheel 24 and the bonnet 16, as seen in FIGS. 1 and 2.

Figure 4:
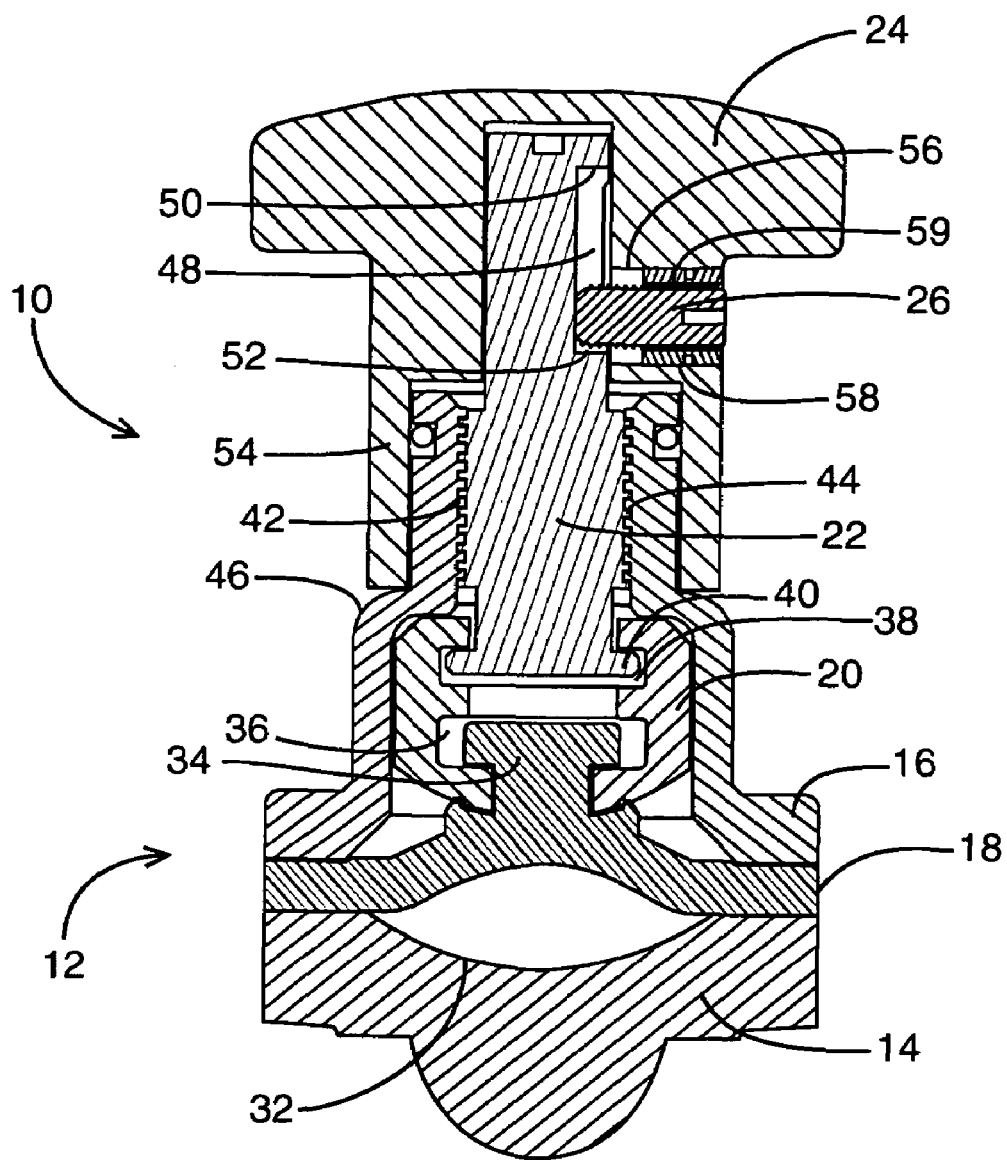
FIG. 4 is cross-sectional view of the diaphragm valve of FIG. 1 with the pin in the second position and the valve in the fully opened position.

The handwheel 24 is provided with a bore 63 (see FIG. 2) that is shaped and suitably sized to be both freely rotatable and freely axially slidable on the stem 22. The pin 26 is adapted to extend through the hole 56 in the handwheel 24 and into the slot 48 in the stem 22 for limiting rotary motion of the handwheel 24 relative to the stem 22, as will hereinafter be described. It can be appreciated that with the pin 26 extending in the slot 48, but not tightened to engage stem 22, and with the stem 22 positioned relative to the bonnet 16, as shown in FIGS. 2 and 4, the handwheel can be moveable between a position wherein the pin 26 is adjacent the first end 50 of the slot 48 (see FIG. 2), and a second position wherein the pin 26 is adjacent the second end 52 of the slot 48 (see FIG. 4). Therefore, the combination of the slot 48 and pin 26 allows the position of the handwheel 24 relative to the stem 22 to be adjustable.

The handwheel has a stop 54 with a surface 202 (see FIG. 2) for contacting the abutment surface 46 of the bonnet 16. In one aspect of the invention, the stop 54 is a collar as best seen in FIG. 1. The abutment surface 46 of the bonnet 16 and the surface 202 of stop 54 of the handwheel 24 together provide a travel stop for limiting the axial movement of the stem 22 relative to the bonnet 16. This travel stop effectively prevents excessive compressive forces from being applied to the resilient diaphragm 18, as will hereinafter become apparent.

Figure 2:
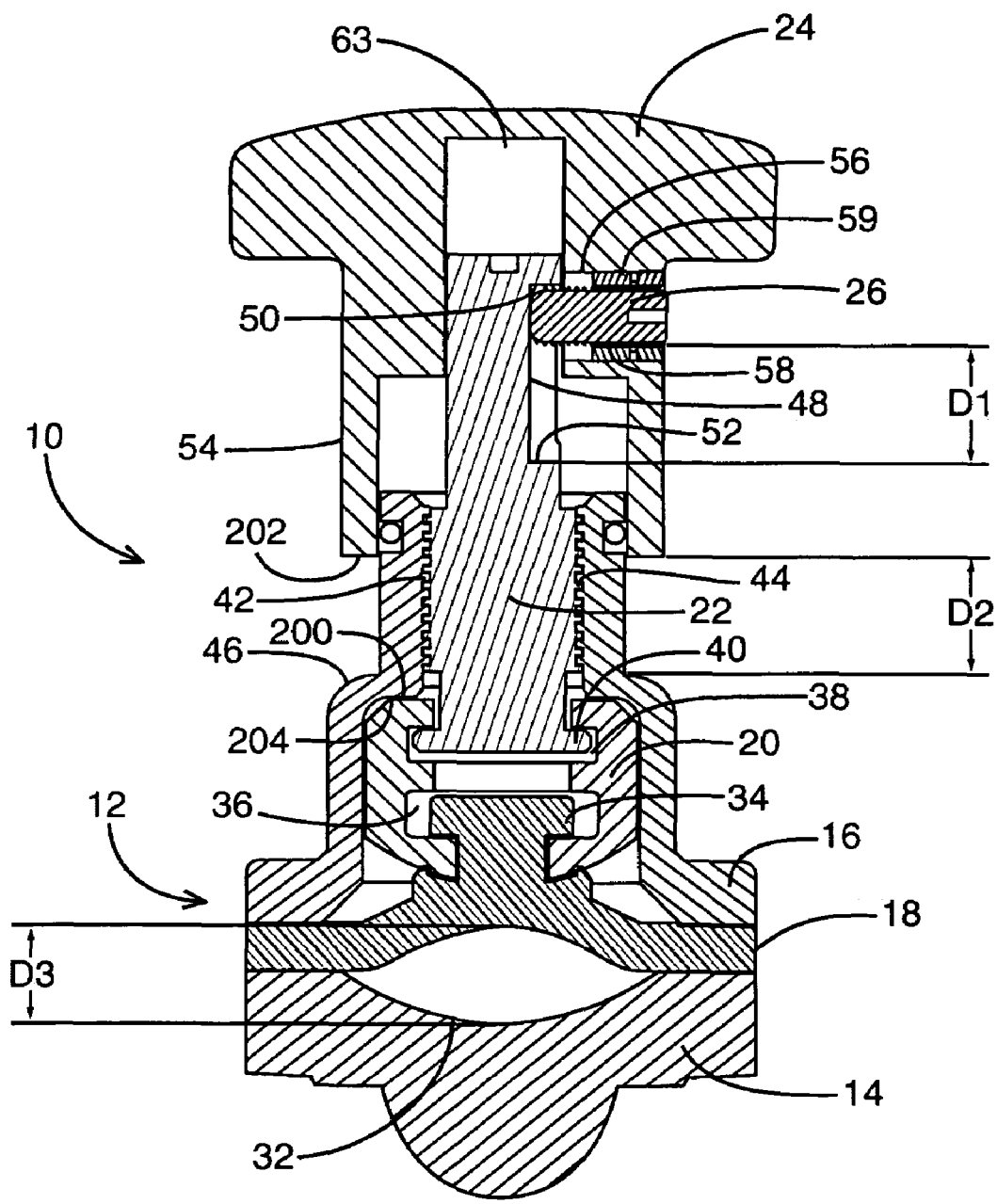
FIG. 2 is a cross-sectional view of the diaphragm valve of FIG. 1 with the pin in the first position and the valve in a fully opened position.
Figure 3:
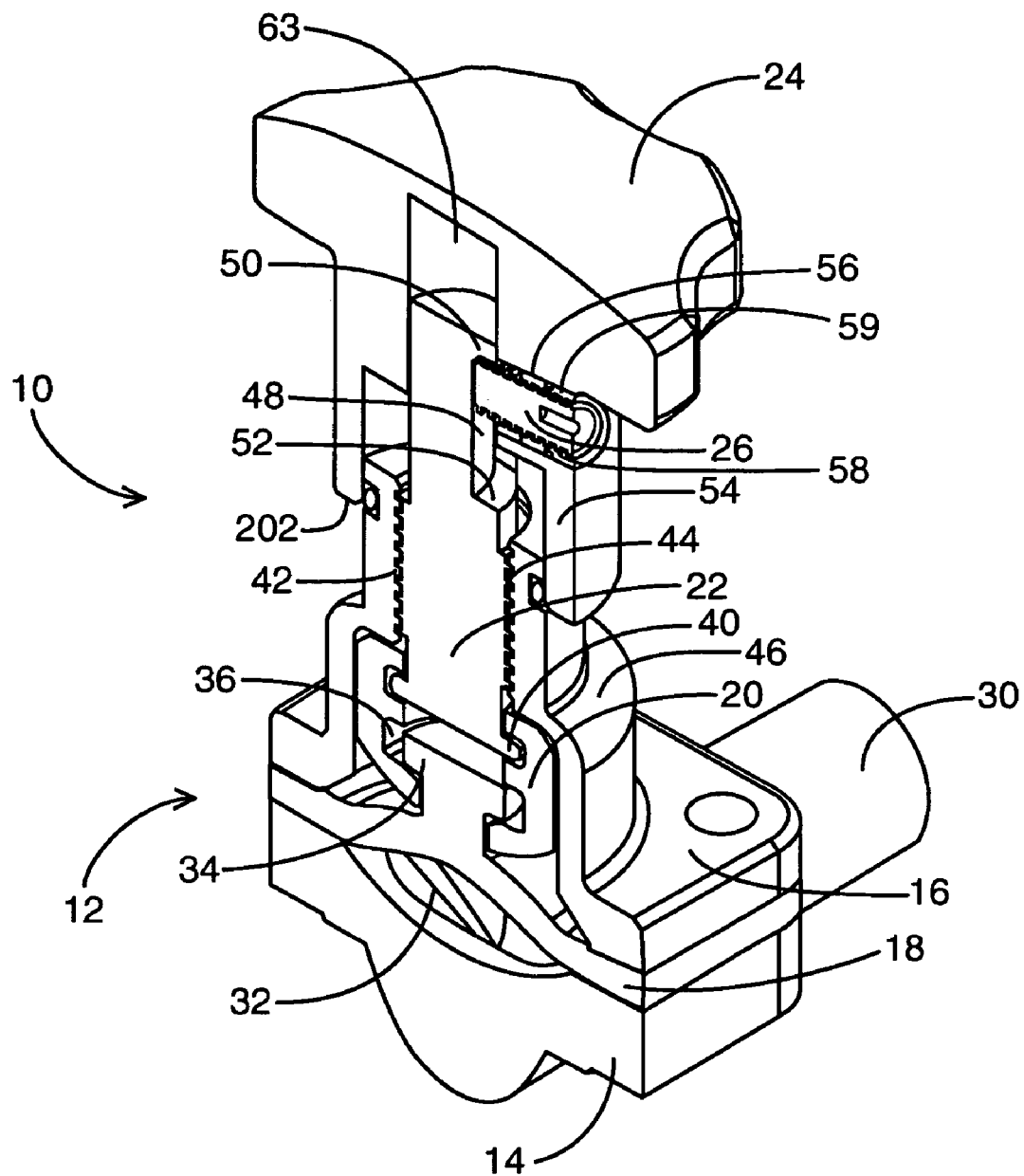
FIG. 3 is a cross-sectional perspective view of the diaphragm valve of FIG. 2.

For the purpose of the illustrated embodiment of this invention, a 'fully opened position' refers to a position wherein the diaphragm 18 is spaced apart from the valve seat 32 to permit the highest flowrate of fluid to pass through the valve housing 12 (see FIGS. 2 and 3). A 'fully closed position' refers to the position wherein the resilient diaphragm 18 abuts the valve seat 32 to prevent fluid from passing through the valve housing 12 (see FIG. 5). A 'partially opened position' refers to a position wherein the diaphragm 18 is spaced apart from the valve seat 32 to permit fluid to pass through the valve housing 12 at a flowrate lower than the highest flowrate referred to above in the fully opened position (see FIG. 6).

Referring now to FIGS. 2 and 3, the valve 10 is shown in the fully opened position with the pin 26 in the first position adjacent the first end 50 of the slot 48. Various definitions will now be described for the embodiment shown. The length of the slot 48 minus the diameter of the pin 26 is defined as distance D1. The length between the surface 202 of stop 54 of the handwheel 24 and the abutment surface 46 of the bonnet 16 is defined as distance D2. The length between the center point of the resilient diaphragm 18 and the center point of the valve seat while the valve 10 is in the fully opened position is defined as distance D3 and is referred to as the stroke of the valve 10. In this embodiment, distance D1 is substantially equal to distance D2, which is substantially equal to distance D3. This design allows the valve to be 'locked' in the fully open position and 'locked' in a fully closed position, as will be hereinafter described.

It can be appreciated that other constructions of the valve 10 are contemplated. For example, the length of the slot minus the diameter of the pin 26 can be designed to be smaller than the stroke of the valve. This construction might be desirable in systems that have space restrictions that require a smaller valve 10. Such a design allows the valve to be 'locked' in a fully closed position as referred to above, and as will hereinafter be described. It can be appreciated, however, that such a design would not allow for the valve to be locked in a fully open position.

Still referring to FIGS. 2 and 3, the inner surface 200 of the bonnet 16 and a surface 204 of the compressor 20 together provide a travel stop for limiting the axial movement of the stem 22 relative to the bonnet 16. This travel stop effectively prevents the stem 22, and hence the handwheel 26, from being inadvertently removed from the valve 10 when the valve 10 is being opened.

Referring now to FIG. 4, the valve 10 is shown in the fully open position with the pin 26 in the second position adjacent the second end 52 of the slot 48. While the valve 10 is arranged in this fashion, the surface 202 of stop 54 of the handwheel 24 contacts the abutment surface 46 of the bonnet 16. While in this position, the handwheel 24 cannot be rotated so as to move the stem 22 downwards any further because the surface 202 of stop 54 of the handwheel 24 is in contact with the abutment surface 46 of the bonnet 16. This is referred to as being 'locked' in the fully opened position, since the position of the diaphragm 18 of the valve 10 cannot inadvertently be moved without purposely effecting a series of steps to move the pin 26 into a different position relative to the slot 48, as will be hereinafter described.

Figure 5:
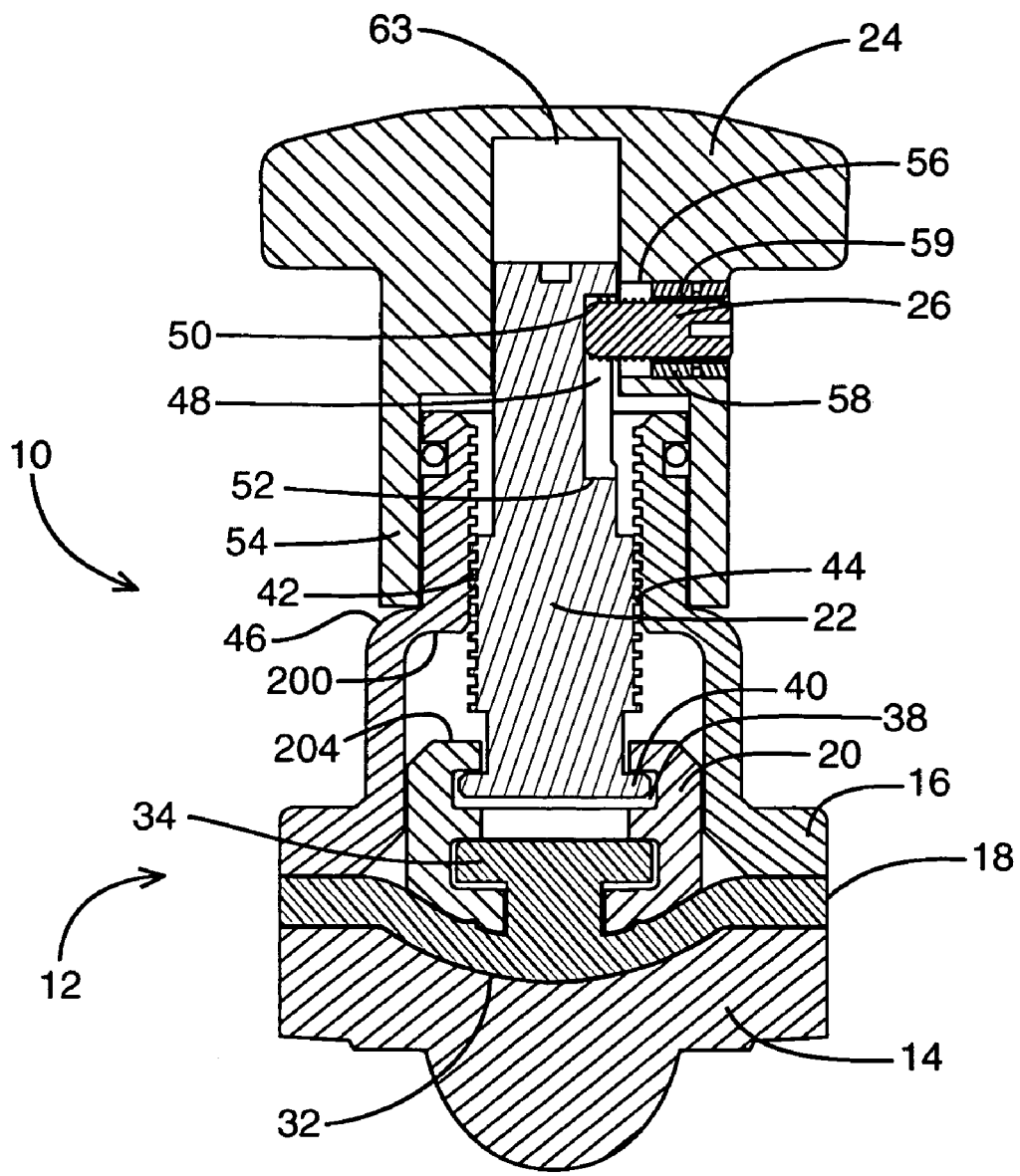
FIG. 5 is a cross-sectional view of the diaphragm valve of FIG. 1 with the pin in the first position and the valve in a fully closed position.

Referring now to FIG. 5, the valve 10 is shown in the fully closed position with the pin 26 in the first position adjacent the first end 50 of the slot 48. While the valve 10 is arranged in this fashion, the surface 202 of stop 54 of the handwheel 24 contacts the abutment surface 46 of the bonnet 16. Additionally, the resilient diaphragm 18 abuts the valve seat 32 to prevent fluid from passing through the valve housing 12. The downward motion of the stem 22 is effectively limited by the travel stop created by the surface 202 of stop 54 on the handwheel 26 and the abutment surface 46 on the bonnet 16. This is referred to as being 'locked' in the fully closed position, since the position of the diaphragm 18 of the valve 10 cannot inadvertently be compressed any further.

Figure 6:
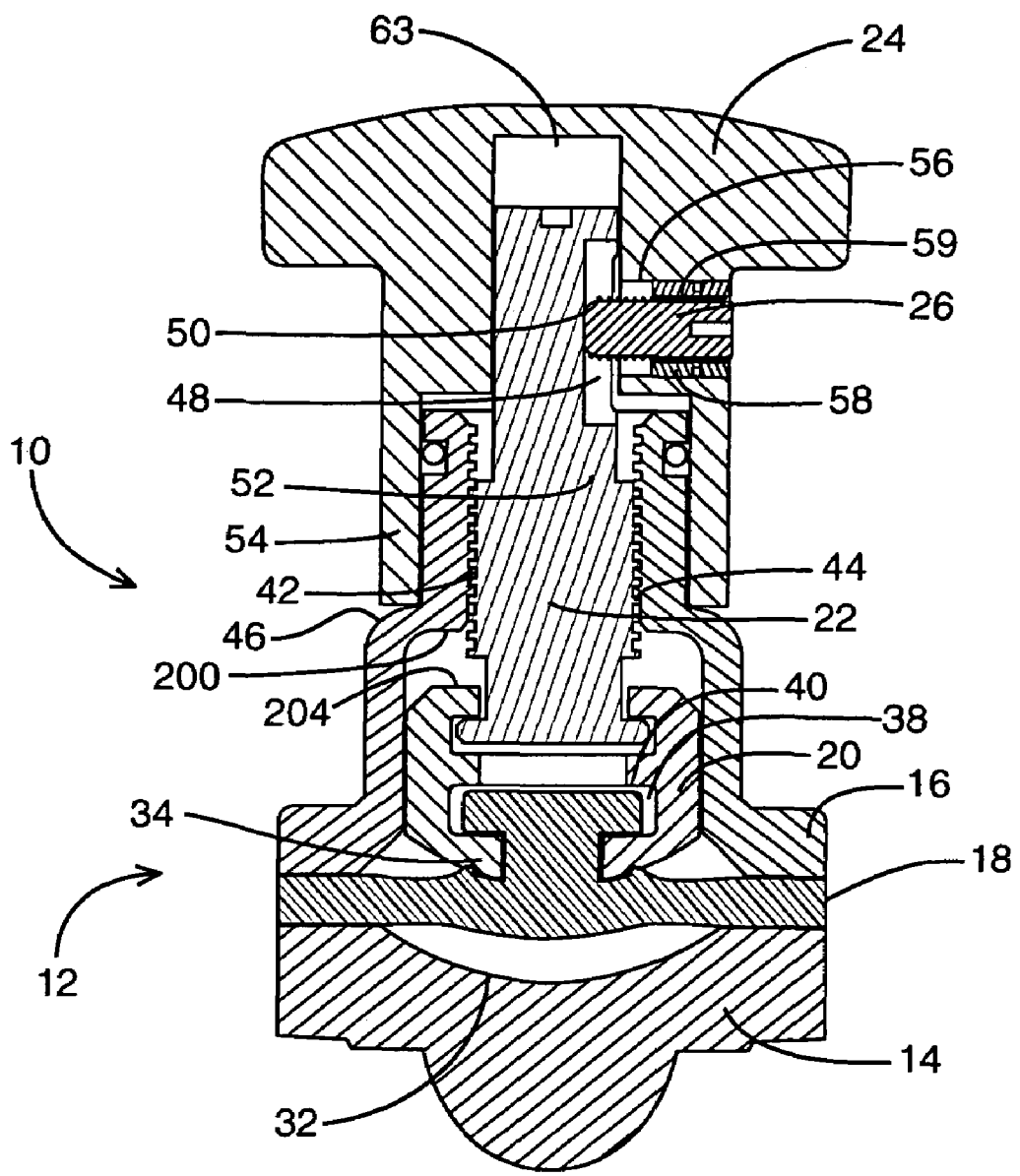
FIG. 6 is a cross-sectional view of the diaphragm valve of FIG. 1 with the pin positioned substantially midway between the first position and the second position and the valve in a partially opened position.

Referring now to FIG. 6, the valve 10 is shown in a partially opened position with the pin 26 positioned substantially between the first position and the second position in the slot 48. While the valve 10 is arranged in this fashion, fluid is permitted to pass through the valve housing 12 at a desired flowrate. Having made the proper adjustment of the position of the handwheel 24 relative to the stem 22 by positioning the pin 26 in the slot 48 in the stem 22, the structure will serve to limit the downward movement of the stem 22 to any predetermined point of travel regardless of the force that may be exerted on the handwheel 24.

The valve 10 shown in FIGS. 1-6 provide a structure to prevent excessive compressive forces from being exerted onto the resilient diaphragm 18 when the handwheel 24 is rotated to move the stem 22 downwards into the fully closed position. This increases the life span of the resilient diaphragm 18. Moreover, the upward movement of the stem 22 and the handwheel 24 is limited when the surface 204 of the compressor 20 comes into contact with the inner surface 200 of the bonnet 16. Thus, an effective stop is provided for the upward and downward movement of the stem 22 so that the amount of travel and flexing that the resilient diaphragm 18 undergoes during adjustment is limited to within an acceptable predetermined range.

The operation of the valve 10 will now be described. To move the valve from the fully closed position with the pin 26 in the first position (as shown in FIG. 5) to the fully opened position with the pin 26 in the first position (as shown in FIGS. 2 and 3) the handwheel 24 is rotated to move the stem 22 axially upwards relative to the bonnet 16. As described above, the upward movement of the stem 22 is limited when the surface 204 of the compressor 20 comes into contact with the inner surface 200 of the bonnet 16.

To move the valve from the fully opened position with the pin 26 in the first position (as shown in FIGS. 2 and 3) to the fully opened position with the pin in the second position (as shown in FIG. 4) a series of steps must be carried out. Specifically, the pin 26 is removed from the first position in the slot 48 and the handwheel 24, the handwheel 24 is pushed down so as to slide axially along the stem 22, and the pin 26 is reinserted into the second position in the slot 48. While in this position, the handwheel 24 cannot be rotated so as to move the stem 22 downwards because the surface 202 of stop 54 of the handwheel 24 is in contact with the abutment surface 46 of the bonnet 16.

Figure 7:
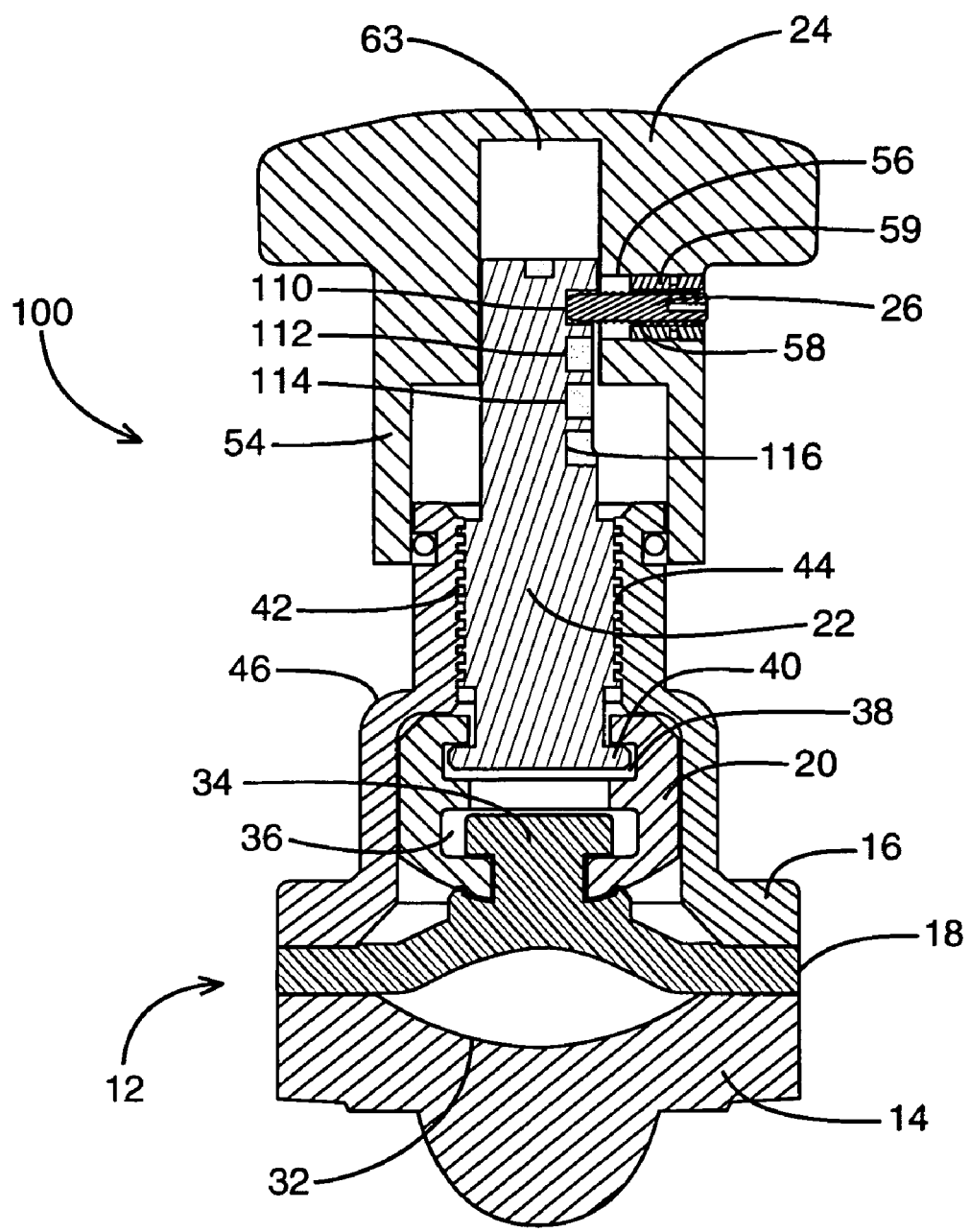
FIG. 7 is cross-sectional view of a diaphragm valve in accordance with a second embodiment of the present invention.

Referring now to FIG. 7, a diaphragm valve in accordance with a second embodiment of the present invention is shown generally at 100. The second embodiment is the same as the first embodiment, except as described below. Specifically, the stem 22 has at least two apertures for accepting the pin 26. In the second embodiment shown in FIG. 7, the stem 22 has a first aperture 110, a second aperture 112, a third aperture 114, and a fourth aperture 116 each of which extend radially into the stem 22 and are shaped and suitably sized to receive the pin 26. It is to be understood that more apertures can be provided and, where necessary, the shape and size of the pin 26 can be modified to accommodate the increased numbers of apertures.

It is understood that for both embodiments, more than one pin 26 may be used to securely attach the handwheel 24 to the stem 22, especially in cases where the valve 10 is large.

I claim:

1. A diaphragm valve, moveable between a fully open position and a fully closed position, the valve comprising:
   (a) a bonnet having an abutment surface;
   (b) a stem moveable relative to the bonnet, the stem having at least one aperture;
   (c) a handle being freely rotatable on the stem and freely axially slidable on the stem, the handle having a stop with a surface for contacting the abutment surface of the bonnet; and
   (d) a pin extending through the handle and into the at least one aperture in the stem for fixing the position of the handle relative to the stem,
   (e) wherein the at least one aperture comprises a slot that extends radially into the stem and axially along the stem and has a circumferential width adapted to receive the pin, the slot having a first end and a second end and the pin being moveable between a first position adjacent the first end and a second position adjacent the second end, and wherein valve when the pin is in the first position and the valve is in the fully closed position the surface of the stop of the handle contacts the abutment surface of the bonnet.

2. A diaphragm valve according to claim 1, wherein when the pin is in the first position and the valve is in the fully open position the distance between the surface of the stop of the handle and the abutment surface of the bonnet is substantially equal to the stroke of the valve.

3. A diaphragm valve according to claim 1, wherein when the pin is in the second position and the valve is in the fully opened position the surface of the stop of the handle contacts the abutment surface of the bonnet.

4. A diaphragm valve according to claim 1, wherein the bonnet defines an opening of a size and configuration to receive therethrough the stem.

5. A diaphragm valve according to claim 1, wherein the bonnet has a first thread and the stem has a second thread that cooperates with the first thread to allow the stem to be axially moveable relative to the bonnet.

6. A diaphragm valve comprising:
(a) a bonnet having an abutment surface;
(b) a stem axially moveable relative to the bonnet and coupled to a flexible diaphragm for moving the diaphragm between fully open and fully closed positions to control flow through the valve; and
(c) a handle coupled to the stem for effecting movement thereof, the handle having a stop surface for engaging the abutment surface, and the handle being releasably securable to the stem in any one of a first and at least a second attachment position along the axial length of the stem at respective distances from the diaphragm; and
(d) at least one of the first and at least second attachment positions being positioned to block movement of the stem by engagement of the stop surface with the abutment surface when the diaphragm is in a desired position.

7. The valve of claim 6, wherein when the handle is secured to the stem in the first attachment position and the diaphragm is in the fully closed position, the stop surface contacts the abutment surface.

8. The valve of claim 7, wherein when the handle is secured to the stem in the second attachment position and the diaphragm is in the fully open position, the stop surface contacts the abutment surface.

9. The valve of claim 7, wherein the handle is releasably securable to the stem in a third attachment position located intermediate the first and second attachment positions.

10. The valve of claim 9, wherein when the handle is secured to the stem in the third attachment position and the diaphragm is in a partially open position, the stop surface contacts the abutment surface.

11. The valve of claim 6 further comprising a pin fixed to the handle and releasably engaging at least one aperture provided in the stem.

12. The valve of claim 11 wherein the at least one aperture comprises a slot extending along a portion of the length of the stem.

13. The valve of claim 12 wherein the slat comprises first and second ends for defining the first and second attachment positions, respectively.

14. The valve according to claim 11, wherein the at least one aperture comprises first and second apertures sized to receive the pin and spaced apart axially along the stem, the pin being moveable between a first position in the first aperture and a second position in the second aperture.

15. The valve according to claim 14, wherein when the pin is in the first position and the valve is in the fully opened position the distance between the stop surface and the abutment surface of the bonnet is substantially equal to the stroke of the valve.

16. The valve according to claim 14, wherein when the pin is in the second position and the valve is in the fully opened position, the stop surface contacts the abutment surface of the bonnet.

17. The valve according to claim 14, wherein when the pin is in the first position and the valve is in the fully closed position, the stop surface contacts the abutment surface of the bonnet.

18. The valve according to claim 14, further comprising at least a third aperture sized to receive the pin and positioned axially between the first aperture and the second aperture.

* * * * *